United States Patent [19]

Hackemann et al.

[11] 3,877,626

[45] Apr. 15, 1975

[54] APPARATUS FOR CUTTING A CONTINUOUS ELEMENT OF INDETERMINATE LENGTH INTO PREDETERMINED LENGTHS

[75] Inventors: William Hackemann; Charles Gwin Renegar, both of Shelbyville, Tenn.

[73] Assignee: National Acceptance Company of America, Chicago, Ill.

[22] Filed: May 21, 1974

[21] Appl. No.: 472,071

[52] U.S. Cl. .................. 225/96.5; 83/323; 83/325; 83/326
[51] Int. Cl. ........................................... B65h 35/00
[58] Field of Search ..................... 83/323, 325, 326; 225/96.5

[56] References Cited
UNITED STATES PATENTS

| | | | |
|---|---|---|---|
| 681,656 | 8/1901 | Perky | 83/326 |
| 3,054,315 | 9/1962 | Sarka | 83/323 |
| 3,247,745 | 4/1966 | Bannon, Jr. et al. | 83/323 |

*Primary Examiner*—J. M. Meister
*Assistant Examiner*—Fred A. Silverberg
*Attorney, Agent, or Firm*—Shapiro and Shapiro

[57] ABSTRACT

Apparatus for cutting a continuous elements of indeterminate length into predetermined lengths employs a pair of transversely spaced endless chains having a plurality of crossplates connected to and extending between the chains. Clamping means and cutting means are respectively mounted on the crossplates. A clamping cam is provided for actuating the clamping means and a cutting cam is provided for actuating the cutting means. The clamping means has a cam follower associated therewith which is cooperable with the clamping cam, and the cutting means has a cam follower associated therewith which is cooperable with the cutting cam.

20 Claims, 15 Drawing Figures

APPARATUS FOR CUTTING A CONTINUOUS ELEMENT OF INDETERMINATE LENGTH INTO PREDETERMINED LENGTHS

The invention relates to improvement in apparatus for cutting a continuous element of indeterminate length into predetermined lengths.

BACKGROUND OF THE INVENTION

Recently, there has been developed a continuous method for manufacturing pencils. A casing or sheathing composition is continuously extruded over a marking core of a pigmented or colored lead or a graphite lead. The leads may be cut to length and fed in end-to-end abutting relation, or preferably, the lead may be continuously extruded to receive thereon the co-extrusion of the casing composition. The continuous length or extrudate of pencil material is coated with a lacquer or paint, and then must be cut into predetermined lengths.

In order to realize the greatest advantages of the operations of extrusion and coating the extrudate, it is desirable that the cutting of the coated extrudate be accomplished continuously at a constant, uniform and rapid rate without injury to the surface of the coated extrudate.

Moreover, the necessity to provide a plurality of coatings to the extrudate with intermediate drying operations necessitates that the extrudate have substantial length before it reaches the cutting apparatus. This imposes an undue burden upon the extruder to alone advance the extrudate. Accordingly, it is desirable that the apparatus for cutting also function to exert a uniform pull upon the extrudate in addition to holding the extrudate firmly as it is being cut to uniform and exact lengths.

SUMMARY OF THE INVENTION

An object of the invention is to provide apparatus for cutting a continuous element of indeterminate length into predetermined lengths without causing injury to the element being cut, particularly where the continuous element is an extrudate which has surface characteristics which may be marred if improperly handled.

Another object of the invention is to provide cutting apparatus of the type under consideration which may be operated at a constant and uniform speed to additionally provide a smooth and uniform pull upon the element being subjected to the cutting operation.

A further object of the invention is to provide apparatus of the type under consideration having the facility to minimize scrap that may otherwise be generated by cutters.

The foregoing objects, and other objects and advantages are accomplished by providing a pair of transversely spaced endless chains having their top reaches lying in one plane and their bottom reaches lying in a second plane. A plurality of crossplates are connected to and extend between the chains. Clamping means and cutting means are mounted on the crossplates. The clamping means and the cutting means are each mounted for movement in the direction of the length of a crossplate. A clamping cam is provided for actuating the clamping means, and a cutting cam is provided to actuate the cutting means. The clamping means has a cam follower associated therewith cooperable with the clamping cam, and the cutting means has a cam follower associated therewith cooperable with the cutting cam. The clamping and cutting cams extend generally in the direction of the length of the chains, or lengthwise of the apparatus. Stated another way, the cams extend generally in the direction of movement of the continuous element which passes through the apparatus when the machine is in operation, the continuous element being held by the moving clamping means and cut by the moving cutting means into the predetermined lengths.

These, and other objects and advantages of the invention will be apparent from the following detailed description, taken in conjunction with the drawings.

DESCRIPTION OF THE PREFERRED EMBODIMENT

While the apparatus of the invention is particularly useful for operation upon extrusion which will ultimately furnish pencils, the apparatus is useful for operation upon any suitable continuous element of indeterminate length, particularly where such element has surface characteristics which may be marred if improperly handled and/or where it is desired that the cutting operation be combined with constant, uniform tension upon the element subjected to the cutting operation. The continuous extrusion or extrudate may omit a central marking core which, when cut to desired lengths by the apparatus of the invention will furnish barrels for mechanical pencils and ballpoint pen barrels. The apparatus about to be described may be mounted in alignment with any equipment in a line, for example, an extruder (not shown) for applying a casing composition to a writing core such as a pigmented or graphite lead, and a cutting device or devices for applying lacquer coatings to the extrudate.

Figure 2:
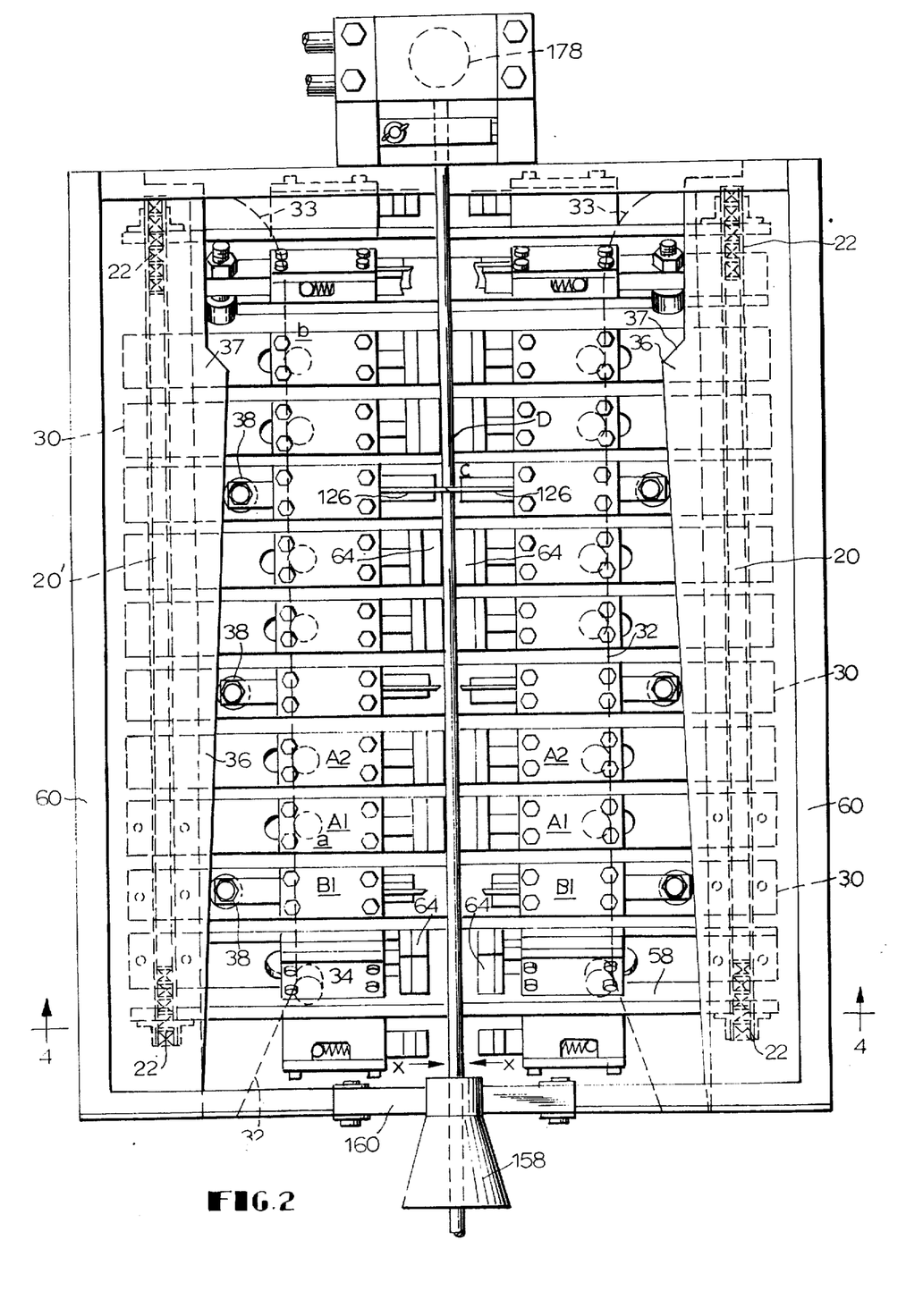
FIG. 2 is a top plan view of the apparatus.
Figure 7:
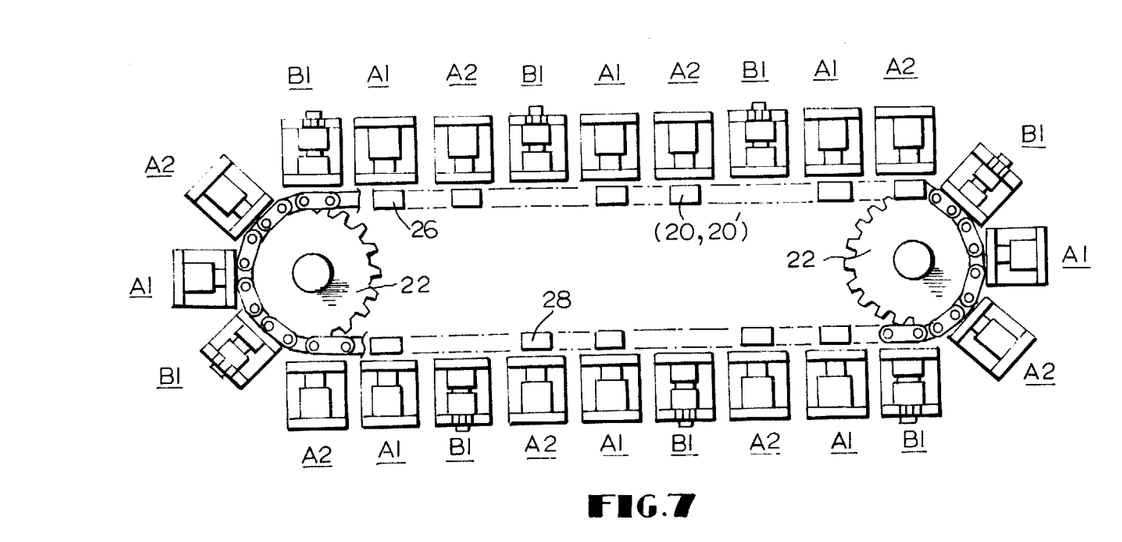
FIG. 7 is a diagrammatic view showing an arrangement wherein there are two clamping means and one cutting means in each set of a plurality of sets.
Figure 9:
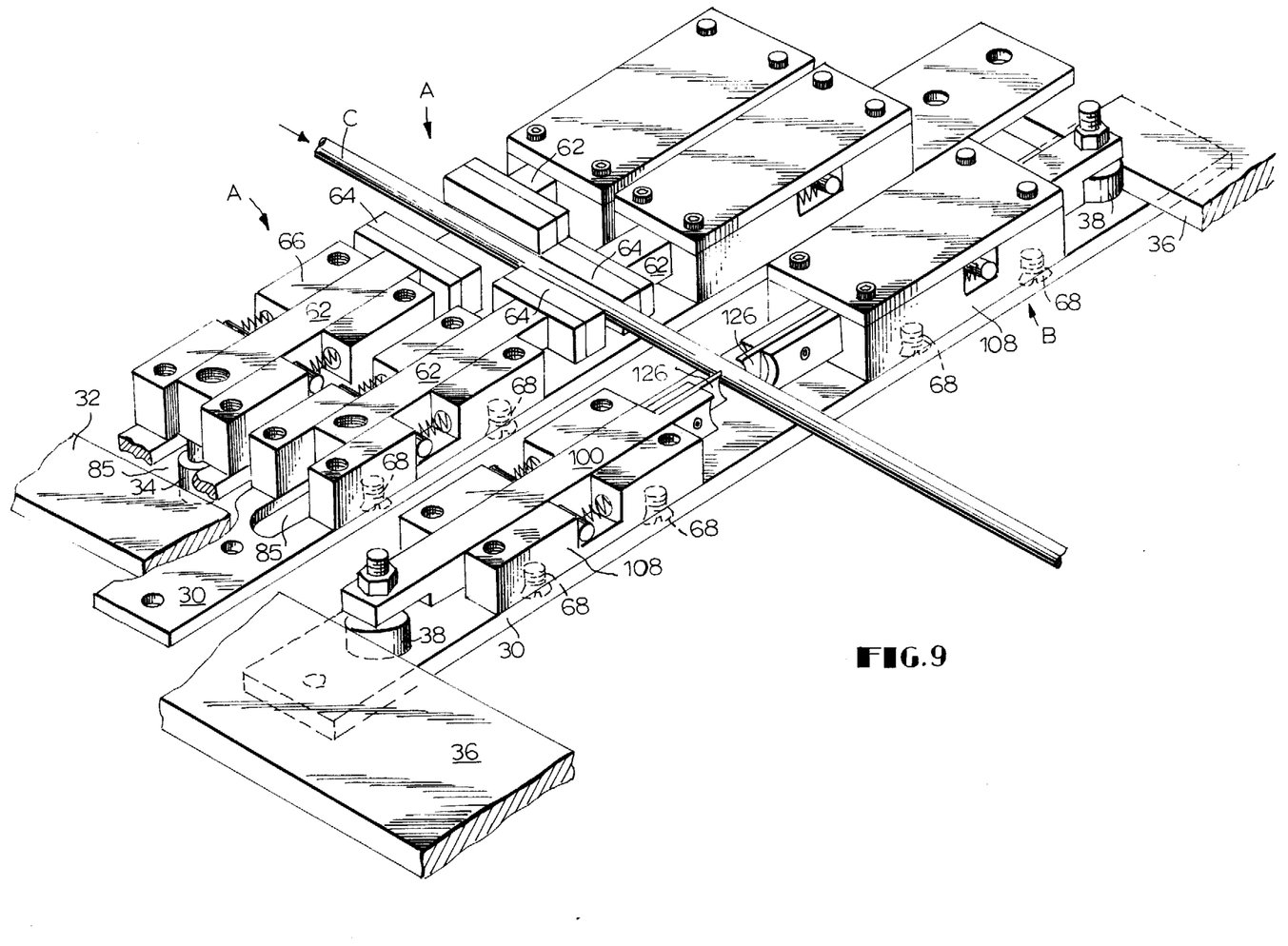
FIG. 9 is a perspective view showing the clamping and cutter means respectively mounted on crossplates and their respective cam followers related to the clamping and cutting cams which are partially shown.

Referring to the drawings and as shown in FIG. 2, apparatus made in accordance with the invention comprises a pair of transversely spaced endless chains 20 and 20' respectively mounted on longitudinally spaced sprockets 22. As shown in FIG. 7, the top reaches 26 of the chains 20, 20' lie in one plane and the bottom reaches 28 of the two chains lie in another or second plane. As best shown in FIGS. 2, 3, 4 and 9, a plurality of crossplates 30 are connected to and extend between the chains 20, 20'. Clamping means A (FIG. 10) and cutting means B (FIG. 12) are mounted on the crossplates 30. Preferably, and as shown in FIG. 9, the clamping means and cutting means are respectively mounted on individual crossplates. There are a plurality of clamping means and a plurality of cutting means and they are each mounted on their respective crossplates for transverse movement in the direction of the arrows x, as shown in FIG. 2, or in the direction of the length of a crossplate. A clamping cam 32 is provided for actuating the clamping means A. Each of the clamping means has a cam follower 34 associated therewith cooperable with the clamping cam 32. A cutting cam 36 is provided for actuating the cutting means B. The cutting means has a cam follower 38 associated therewith cooperable with the cutting cam. As shown in FIG. 2, the clamping cam 32 and the cutting cam 36 extend generally in the direction of the lengths of the chains 20, 20' or longitudinally of the machine.

In the preferred and illustrated embodiment of the invention, the clamping means A are in pairs, and the cutting means B are in pairs; that is, there are two opposing clamping assemblies mounted on a crossplate and two opposing cutting assemblies mounted on an adjacent crossplate. Accordingly, the apparatus includes a second clamping cam and a second cutting cam so that there are two of these cams extending longitudinally on each side of the machine for cooperation with the cam followers of opposite clamping assemblies and for cooperation with the cam followers of opposite cutting assemblies.

Figure 1:
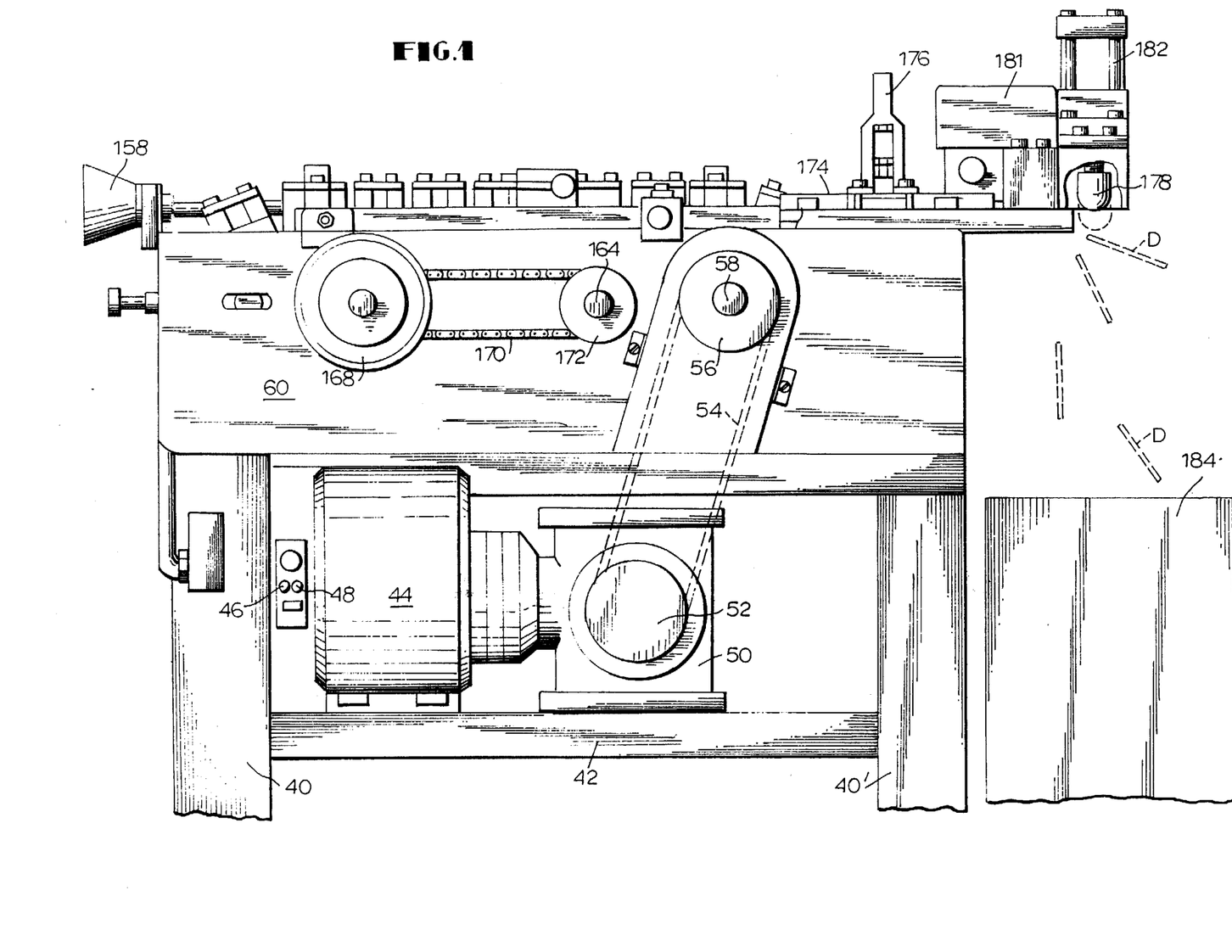
FIG. 1 is a side elevational view of apparatus made in accordance with the invention.

In greater detail, and as shown in FIGS. 1 and 2, the apparatus is mounted on longitudinally spaced legs 40, 40' on each side of the machine, the legs on one side being shown. The legs are spanned by a longitudinally extending support member 42 upon which is mounted a suitable motor 44 having the usual on/off switch 46 and a jog-run switch 48. The shaft of the motor extends into a transmission 50 with the output shaft (not shown) to a sprocket 52. A chain 54 extends around the sprocket 52 and a second sprocket 56, the shaft of which 58 serves to support and drive the sprockets 22 for the chains 20, 20'. The machine may be provided with side mounting plates 60.

Figure 3:
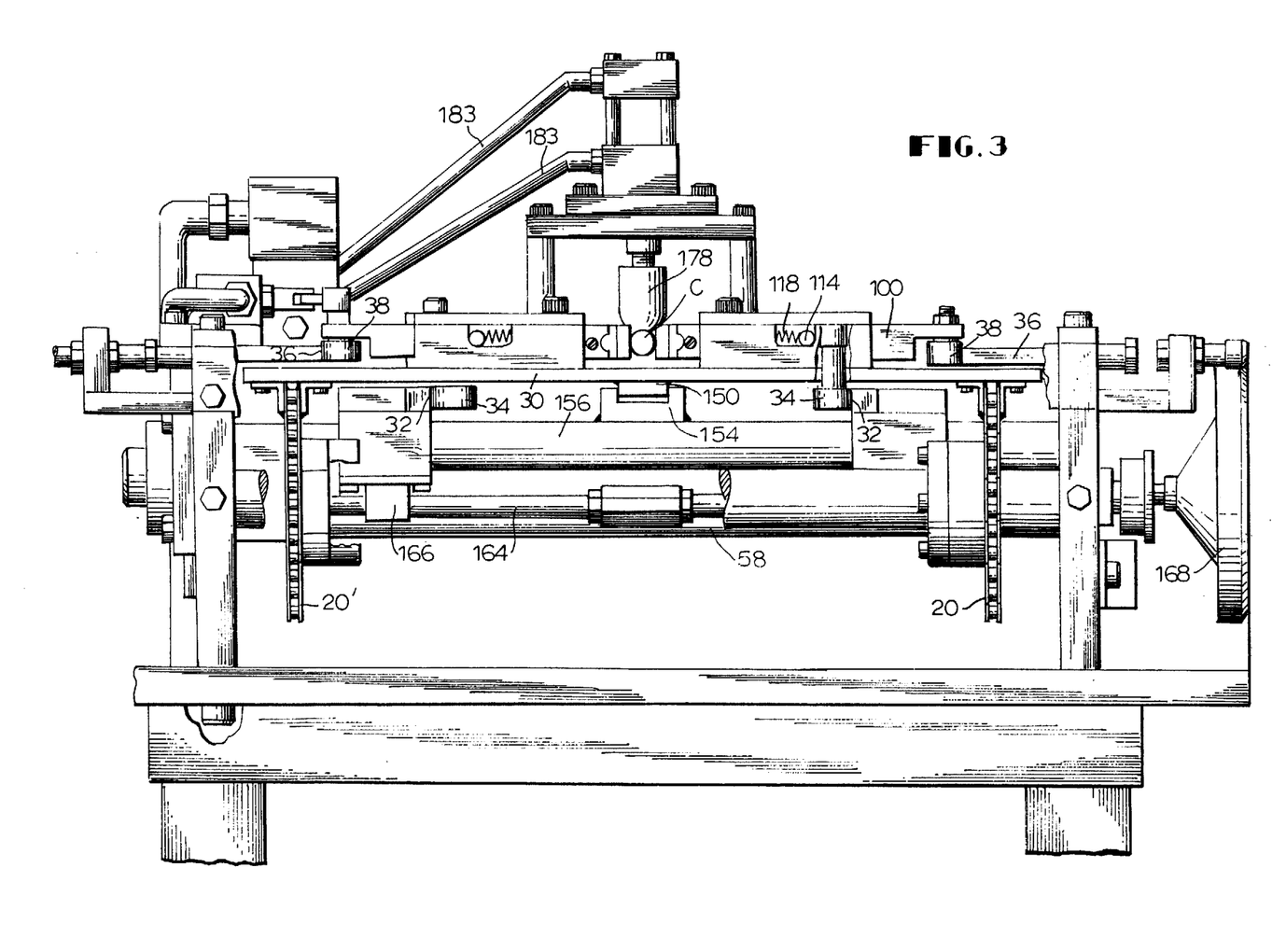
FIG. 3 is a front elevational view, partly broken away and in section.
Figures 4, 5:
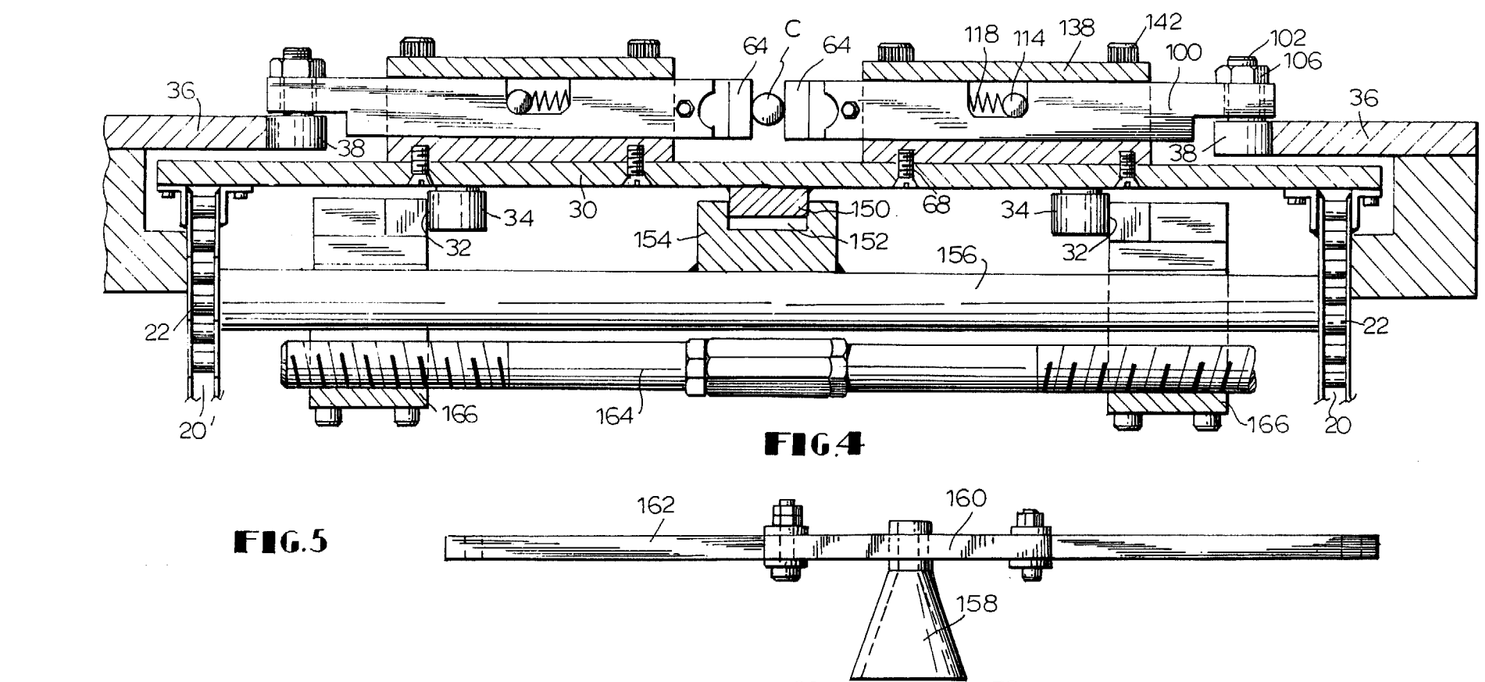
FIG. 4 is a vertical cross-sectional view taken approximately in the plane of line 4—4 of FIG. 2.
FIG. 5 is a top plan view of the guide for centering the continuous element as it enters the apparatus.
Figure 10:
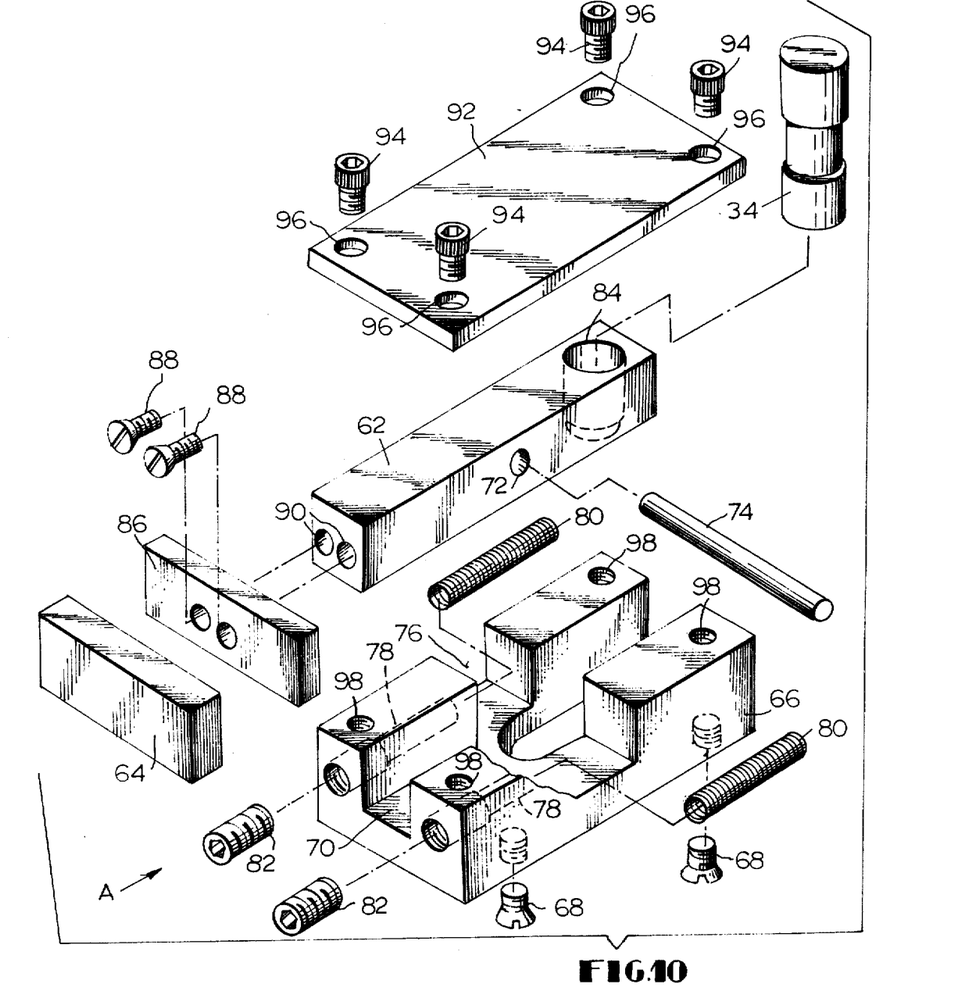
FIG. 10 is an exploded perspective view of the component parts of a clamping means and its associated cam follower.
Figure 11:
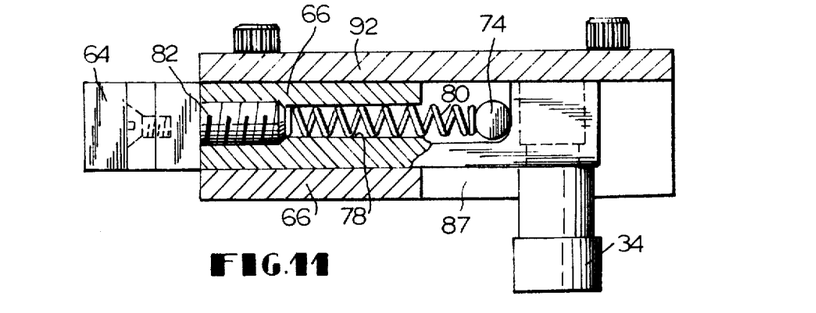
FIG. 11 is a side elevational view, partly in section, showing a clamping bar and its associated cam follower.

Referring to FIGS. 9, 10 and 11, the clamping means A comprises a spring mounted bar 62 mounted on the crossplate 30. The clamping bar is provided with resilient gripping means 64 at one end and the cam follower 34 at the opposite end. The clamping bar 62 is mounted for reciprocation in a guide block 66 and the guide block in turn is fixed to the crossplate 30 by any suitable means such as by welding or by screws 68 as shown. The guide block is provided with a longitudinally extending recess 70 for the positioning of the clamping bar 62 therein with a slight amount of clearance. The clamping bar is provided with an aperture 72 extending through its width so that a pin 74 may be extended therethrough. The pin is of a width substantially equal to the width of the guide block and is received in a cross-slot or recess 76. The guide block is provided on each side with longitudinally extending apertures 78 within which are positioned compression springs 80 having their inner ends in engagement with the crosspin 74. The opposite ends of the springs are engaged by set screws 82 which are matingly received in a threaded counterbore of each aperture 78. The cam follower 34 is extended through an opening 84 in one end of the clamping bar 62 and held by a press fit. The cam follower is connected to the clamping bar so that its operating portion extends below the crossplate 30 upon which the clamping bar is mounted in order that the cam follower may cooperate with the clamping cam 32 which is located below the level of the crossplates, as shown in FIGS. 3 and 4. To allow the cam followers to reach below the crossplates, the crossplates are each provided with a slot 85 (FIG. 9). The guide block 66 is provided with an aligned slot 87. At the opposite end of the clamping bar, a support member 86 is secured to the clamping bar by screws 88 received in tapped holes 90 provided in the end of the clamping bar. The member 86 serves as a support for the resilient gripping pad 64 of rubber or any other suitable friction-gripping type of material. The pad is secured to the underlying support in any desired manner such as by a suitable adhesive.

The clamping bar 62 is maintained in the groove 70 of the guide block 66 by a cover plate 92. The cover plate is secured to the guide block by screws 94 extended through openings 96 in the cover plate in alignment with tapped holes 98 in the guide block. This arrangement allows the spring mounted clamping bar 62 having the resilient gripping means 64 at one end and the cam follower 34 at the opposite end to reciprocate in the guide block when the cam follower is moved with respect to the stationary clamping cam 32. As shown in FIGS. 2, 4 and 9, a pair of clamping means or assemblies A are mounted on a single crossplate 30 opposite one another so that the gripping members 64 may engage opposite sides of a continuous element of indeterminate length C, such as an extrudate, when the clamping bars 62 are actuated by the cam followers in movement against the longitudinally extending cams.

Figure 12:
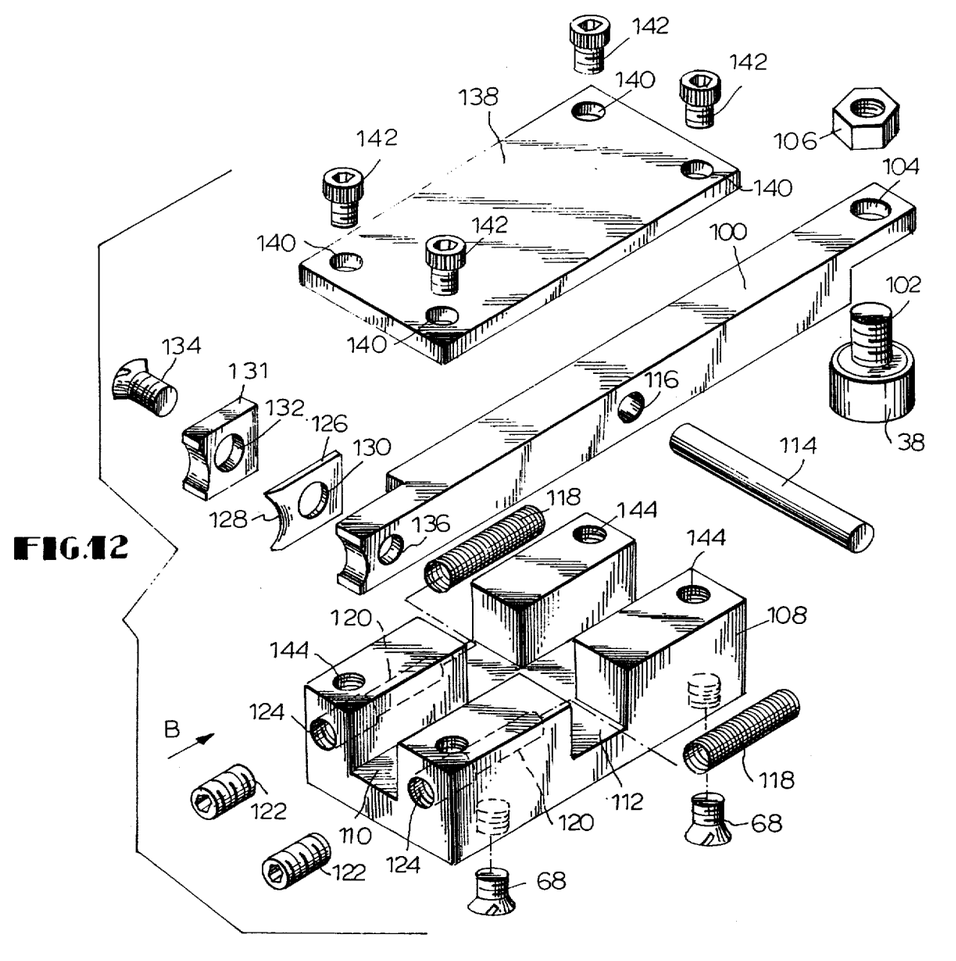
FIG. 12 is an exploded perspective view of the components of a cutting means and its associated cam follower.
Figure 13:
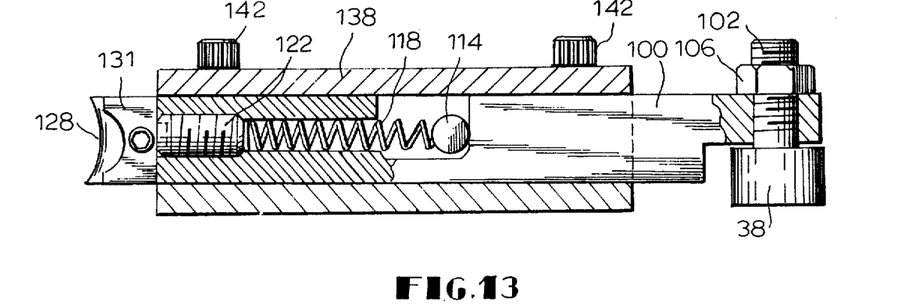
FIG. 13 is a side elevational view, partly in section, showing the cutting bar and its associated cam follower.

Regarding the cutting means B, and as previously indicated, such means, like the clamping means, is connected or mounted upon a crossplate 30. Referring to FIGS. 9, 12 and 13, each cutting assembly comprises a cutting bar 100 having at one end a cam follower 38 secured thereto. As illustrated, the cam follower may be a roller having a threaded spindle 102 which is extended through an opening 104 in the cutting bar and secured to the bar by a nut 106. The cutting bar 100 is mounted for reciprocation in a guide block 108 and for this purpose the guide block is provided with a longitudinally extending recess 110 having a width to receive the cutting bar with a slight amount of clearance. The guide block is provided with a cross-slot or recess 112 having a width substantially equal to the length of a pin is extended through an aperture 116 in the cutting bar and is engaged by a pair of compression springs 118 which are positioned in the bores 120 extending from the front face of the guide block to the recess 112. The opposite ends of the springs are engaged by set screws 122 matingly received in threaded counterbores 124 so that the cutting bar is normally biased by the springs in a direction to cause the follower 38 to resiliently engage the cutting cam 36. At the end of the cutting bar opposite the end having the cam follower connected thereto, the cutting bar is notched to receive a cutting blade 126 having a concavely arcuate cutting edge 128. The cutting plate is provided with an aperture 130 and is secured to the cutting bar by a connector piece 131 having an opening 132. A screw 134 is extended through the openings 132 and 130, also an opening 136 in the cutter bar too secure the blade in place, As in the case of the clamping assembly, the cutting bar is maintained in the groove or recess 110 of the guide block by a cover 138, the cover having openings 140 at its corners so that screws 142 may be extended through the openings and into tapped holes 144 in the guide block.

As in the case of the clamping means, and as shown in FIG. 9, it is preferred that the cutting means B be used in opposite pairs and mounted on the same crossplate so that the continuous element C is cut on opposite sides.

Figure 8:
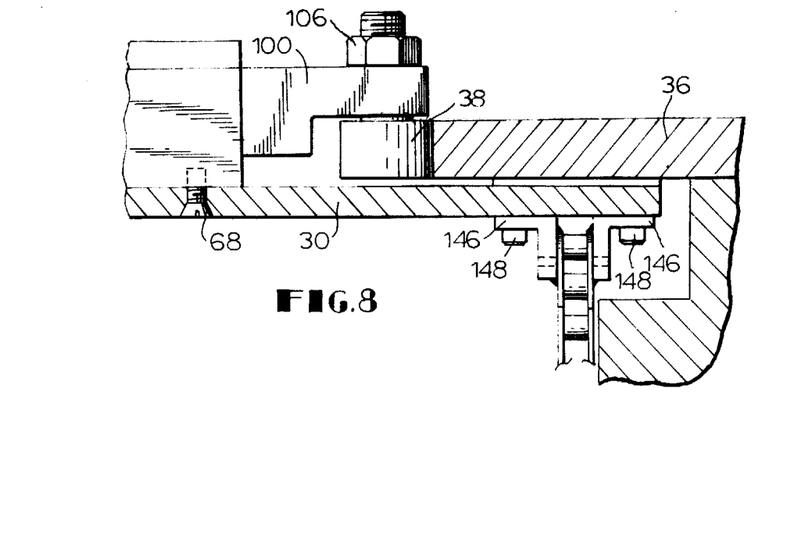
FIG. 8 is a detailed view, partly in cross section, showing the manner in which a crossplate is secured to one of the chains, this view also showing the relationship of the cutter cam follower with respect to the cutter cam.

FIG. 8 illustrates the manner of connecting a crossplate 30 to the chains 20 and 20'. Actually, the connection is made to individual links of each of the chains in order not to interfere with the desired flexibility or articulation of the chains when they are driven around the sprockets. As illustrated, a pair of L-shaped brackets 146 are used, one on each side of the chain. Each bracket has one leg thereof suitably fastened to the crossplates as by a headed, threaded bolt 148 as shown. The other leg of the bracket is secured to the link in any suitable manner. Chain may be purchased which has the brackets connected thereto by a connector pin arrangement.

As shown in FIGS. 3 and 4, the crossplates 30 are each provided on their undersides with a guide bar 150. The guide bars of the cross-plates are received in a groove 152 of a guide rail 154 which is secured to a cross member 156 or longitudinally spaced cross member as by welding.

Figure 6:
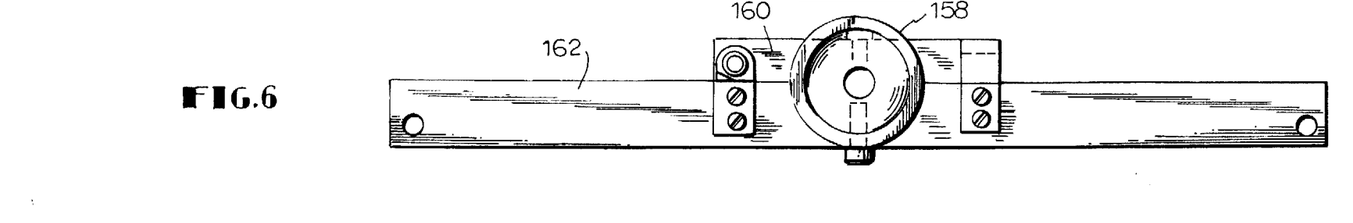
FIG. 6 is a front view of the guide shown in FIG. 5.

To assure that the continuous element or extrudate C enters the apparatus in the desired centralized location, the front end of the machine is provided with a guide 158, as shown in FIGS. 1 and 2. In greater detail, and as shown in FIGS. 5 and 6, the guide 158 is in the form of a cone having its base secured to a bracket 160. This bracket in turn is mounted on a cross member 162 which is mounted on the machine's tranversely spaced side mounting plates 60.

The apparatus also is provided with means for adjusting the pressure upon the continuous element C to be held by the clamping means A as the continuous element is cut by the cutting means B. For this purpose, and referring to FIG. 3, an adjusting shaft 164 is provided to extend between the clamping cams 32. These cams are provided with extensions 166, one of which is shown, which are internally threaded for engagement with a threaded portion on the shaft 164. The movement of the cams toward and away from one another to thereby cause a change in the clamping pressure exerted by the gripping pads 64 on the clamping bars is accomplished by means of a handwheel 168 positioned in the side of the machine. As also shown in FIG. 1, the handwheel is connected to the shaft 164 by a chain and sprocket arrangement 170, 172. This arrangement allows adjustment of pressure by the clamping means while the machine is in operation.

Figure 14:
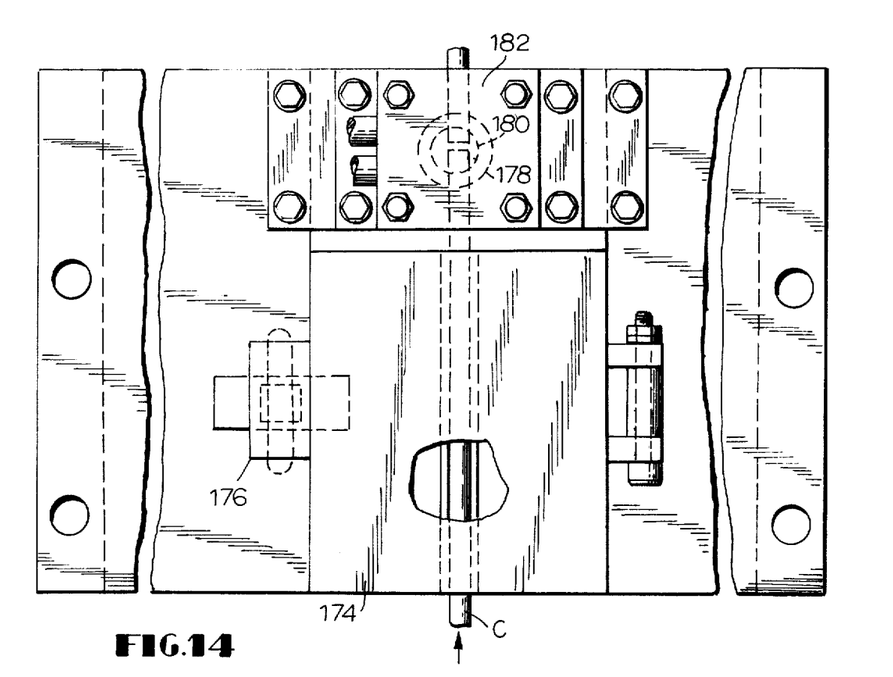
FIG. 14 is a top plan view of the end of the apparatus from which the cut lengths emerge, this view also showing means for assisting in breaking off the predetermined cut lengths from the continuous indeterminate length.
Figure 15:
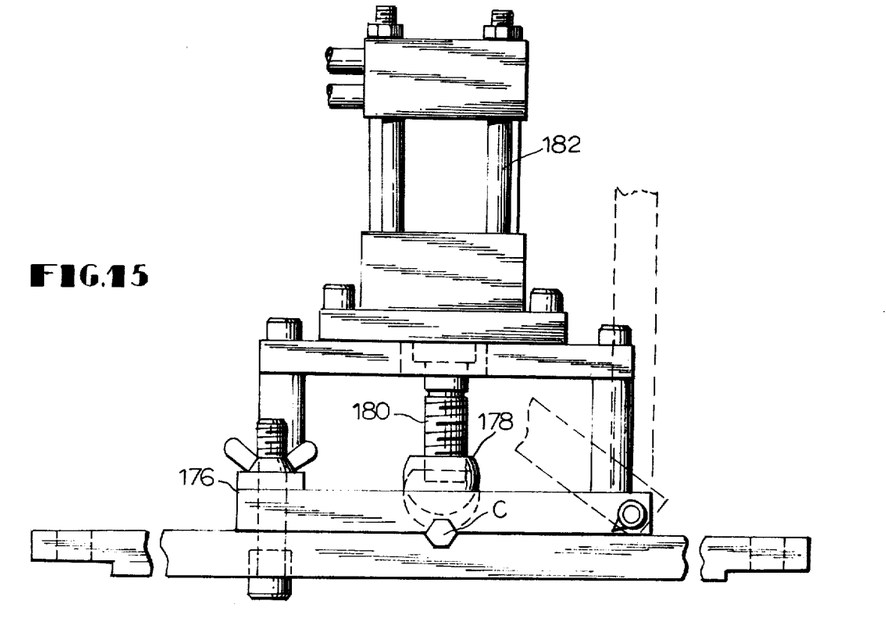
FIG. 15 is an end view of the apparatus as shown in FIG. 14.

Although the operation of a pair of cutting blades on opposite sides of the moving continuous element is normally sufficient to effectuate separation of cut lengths D (FIG. 1) from the continuous length or extrusion C from which they are cut, to assure the separation of the cut lengths, the apparatus may be provided with a breaker device or means for imparting an impact force to the section of the continuous element following the action of the cutting means. As shown in FIGS. 1, 14 and 15, the machine may be provided with a breaker bed plate 174 having a clamp 176 associated therewith. The clamp is pivotally arranged to hold the plate over the moving continuous element which has already been cut. The clamp allows lifting of the plate to inspect the product at the beginning of a run. Forward of the plate and clamp, a breaker element in the form of a ball 178 is provided at the end of a shaft 180 which is actuated from within an air cylinder 182. An air valve in a housing 181 is provided in conjunction with the air cylinder 182. The air actuated breaker unit is connected to a source of compressed air (not shown) by the lines 183 (FIG. 3). The breaker ball is set to reciprocate at predetermined timed intervals to hit the emerging cut lengths D and to completely separate the cut lengths from the continuous element if there still may be a small fin connecting the parts at the cut area. The cut elements drop into a receptacle 184.

When the apparatus is used in the manufacture of pencils, the clamping means A and the cutting means B are respectively mounted on the crossplates 30 in sets, with each set comprising a cutting means and at least one clamping means. FIG. 7 illustrates diagrammatically an arrangement of clamping means and cutting means for producing, for example, pencils having a length of 7 inches, one of the standard lengths in the pencil industry. Each set of cutting and clamping means consists of one cutting means B1 and two clamping means, A1 and A2. Actually, A1 and A2 are identical in that each comprises a pair of oppositely arranged clamping means or assemblies A on a single crossplate, as illustrated in FIG. 9. This same machine may be used to produce pencils having lengths of 14 inches by removing a pair of oppositely disposed cutting means to increase the distance between longitudinally spaced cutting means. Where the machine is set up to produce pencil lengths of 4-½ inches, pencils having lengths which are multiples of 4-½ inches may be made by removing selected pairs of oppositely disposed cutting means to increase the distance between longitudinally spaced cutting means.

The operation of the apparatus will be described with reference to FIG. 2 which illustrates the relationship of the cam followers of the clamping means and of the cutting means with respect to the clamping cams and the cutting cams. At B1 the blades are fully apart. The clamping means A1 and A2 have come to gripping engagement with the continuous element C shortly after the element enters the apparatus and the clamping means continue to firmly grip opposite sides of the element throughout the movement of the element through the apparatus. The moving clamping means apply tension to and pull the continuous element at a constant and uniform rate which is synchronized with the rate of extrusion when the continuous element is an extrudate delivered from an extruder. After cutting, the cut lengths D are held by the gripping pads. This will be evident from the practically straight-line character of the clamping cams 32 between the points a and b, the latter point being located after the severance of the continuous element at c. The clamping cams diverge at at the exit end of the machine at 33. The cutting cams 36, which like the clamping cams 32 extend generally lengthwise of the apparatus, converge toward one another in the direction of movement of the continuous element. Thus, the blades 128 move progressively closer to one another until opposite blades engage one another and cut the continuous element at c, a point more nearly toward the exit end of the machine so that the cut lengths D have a minimum distance to travel in the machine. The cutting cams fall away abruptly at 37 to allow the spring mounted cutting blades to move apart. The breaker unit is located beyond the diverging portions 33 of the clamping cams to allow the cut lengths D to be pushed forward, and broken by the breaker ball if there is a slight fin at the line of severance.

While it is preferred that each cutting means comprises a pair of identical assemblies mounted on opposite sides of the continuous element to be cut, it will be apparent that a cutting blade may be used having a cutting edge contour which is cooperable with an anvil instead of with a similar cutting blade as illustrated.

Where the continuous element to be cut may be slightly flexed without damage, it is not essential that the clamping assemblies on opposite sides of the element be identical. One side may provide a platen or anvil.

It is believed that the advantages and improved results furnished by the apparatus of the invention will be apparent from the foregoing detailed description of a preferred embodiment of the invention. Various changes and modifications may be made without departing from the spirit and scope of the invention as sought to be defined in the following claims.

We claim:

1. Apparatus for cutting a continuous element of indeterminate length into predetermined lengths, the apparatus comprising a pair of transversely spaced, endless chains having the top reaches of the chains lying in one plane and the bottom reaches lying in a second plane, a plurality of crossplates connected to and extending between the chains, clamping means and cutting means mounted on the crossplates, the clamping means and cutting means each being mounted for movement in the direction of the length of a crossplate, a clamping cam for actuating the clamping means, the clamping means having a cam follower associated therewith cooperable with the clamping cam, and a cutting cam for actuating the cutting means, the cutting means having a cam follower associated therewith cooperable with the cutting cam, the clamping and cutting cams extending generally in the direction of the length of the chains.

2. Apparatus according to claim 1, wherein the clamping means and the cutting means are in sets, each set comprising a cutting means and at least one clamping means, each respectively mounted on a crossplate.

3. Apparatus according to claim 1, wherein the clamping means includes a first spring mounted clamping bar mounted on a crossplate, the clamping bar having resilient gripping means at one end and the cam follower at the opposite end.

4. Apparatus according to claim 3, wherein there are two clamping cams, one on each side of the apparatus; and wherein the clamping means includes a second spring mounted clamping bar mounted on the same crossplate and opposite the first clamping bar, the second bar having resilient gripping means at the end facing the end of the first bar having the resilient gripping means, the opposite end of the second bar having a cam follower for engagement with the other clamping cam.

5. Apparatus according to claim 4, wherein the clamping bars are respectively mounted for reciprocation in aligned guide blocks fixed to the crossplate.

6. Apparatus according to claim 5, wherein the cutting bars are respectively mounted for reciprocation in aligned guide blocks fixed to the crossplate.

7. Apparatus according to claim 6, wherein the clamping means and the cutting means are in sets, each set comprising a cutting means and at least one clamping means, each respectively mounted on a crossplate.

8. Apparatus according to claim 3, wherein the cutting means includes a first spring mounted cutting bar mounted on a crossplate, the bar having a blade at one end and the cam follower at the opposite end.

9. Apparatus according to claim 4, wherein there are two cutting cams, one on each side of the apparatus; and wherein the cutting means includes a second spring mounted cutting bar mounted on the same crossplate and opposite the first cutting bar, the second bar having a blade at the end facing the end of the first bar having the blade, the opposite end of the second bar having a cam follower for engagement with the other cutting cam.

10. Apparatus according to claim 9, including means for adjusting the distance between the two clamping cams.

11. Apparatus according to claim 9, including means for imparting an impact force to the section of the continuous element following the action of the cutting means.

12. Apparatus according to claim 11, wherein the means for imparting an impact force comprises a breaker element mounted to reciprocate at predetermined timed intervals.

13. Apparatus according to claim 4, including means for adjusting the distance between the two clamping cams.

14. Apparatus according to claim 4, including means for imparting an impact force to the section of the continuous element following the action of the cutting means.

15. Apparatus according to claim 14, wherein the means for imparting an impact force comprises a breaker element mounted to reciprocate at predetermined timed intervals.

16. Apparatus according to claim 1, wherein the cutting means includes a first spring mounted cutting bar mounted on a crossplate, the bar having a blade at one end and the cam follower at the opposite end.

17. Apparatus according to claim 16, wherein there are two cutting cams, one on each side of the apparatus; and wherein the cutting means includes a second spring mounted cutting bar mounted on the same crossplate and opposite the first cutting bar, the second bar having a blade at the end facing the end of the first bar having the blade, the opposite end of the second bar having a cam follower for engagement with the other cutting cam.

18. Apparatus according to claim 17, wherein the cutting bars are respectively mounted for reciprocation in aligned guide blocks fixed to the crossplate.

19. Apparatus according to claim 1, including means for imparting an impact force to the section of the continuous element following the action of the cutting means.

20. Apparatus according to claim 19, wherein the means for imparting an impact force comprises a breaker element mounted to reciprocate at predetermined timed intervals.

* * * * *